(12) United States Patent
Bruder et al.

(10) Patent No.: US 7,182,389 B2
(45) Date of Patent: Feb. 27, 2007

(54) HARDTOP VEHICLE ROOF WITH THREE RIGID ROOF PIECES

(75) Inventors: Gernot Bruder, Karlsruhe (DE); Marcus Papendorf, Besigheim (DE); Peter Netzel, Hamburg (DE); Thorsten Schumacher, Kammerfeld (DE); Thomas Halbweiss, Remseck (DE)

(73) Assignee: Magna Car Top Systems GmbH (DE)

( * ) Notice: Subject to any disclaimer, the term of this patent is extended or adjusted under 35 U.S.C. 154(b) by 56 days.

(21) Appl. No.: 10/510,540

(22) PCT Filed: Apr. 2, 2003

(86) PCT No.: PCT/EP03/03440

§ 371 (c)(1),
(2), (4) Date: Mar. 7, 2005

(87) PCT Pub. No.: WO03/084773

PCT Pub. Date: Oct. 16, 2003

(65) Prior Publication Data

US 2005/0156449 A1    Jul. 21, 2005

(30) Foreign Application Priority Data

Apr. 9, 2002   (DE) .................. 102 15 663
Sep. 16, 2002  (DE) .................. 102 43 070
Dec. 11, 2002  (DE) .................. 102 58 545

(51) Int. Cl.
*B60J 7/08* (2006.01)
(52) U.S. Cl. .................................. 296/108
(58) Field of Classification Search ........... 296/108
See application file for complete search history.

(56) References Cited

U.S. PATENT DOCUMENTS 6,736,444 B2 *  5/2004  Reinsch ................. 296/107.17
6,767,045 B2 *  7/2004  Reinsch ................. 296/107.17

FOREIGN PATENT DOCUMENTS

| DE | 196 42 152 A1 | 4/1998 |
| DE | 199 34 673 C1 | 1/2001 |
| DE | 100 06 296 C1 | 5/2001 |
| DE | 199 64 029 C1 | 5/2001 |
| DE | 199 62 070 A1 | 7/2001 |
| DE | 101 08 493 A1 | 9/2001 |
| DE | 100 42 460 A1 | 3/2002 |
| DE | 101 19 069 A1 | 10/2002 |
| DE | 101 33 957 A1 | 2/2003 |
| DE | 101 19 069 C2 | 3/2003 |
| DE | 101 50 218 A1 | 5/2003 |
| EP | 1 112 879 A2 | 7/2001 |
| EP | 1 302 351 A2 | 4/2003 |
| GB | 191272 | 1/1923 |

* cited by examiner

*Primary Examiner*—Dennis H. Pedder
(74) *Attorney, Agent, or Firm*—Brooks Kushman P.C.

(57) ABSTRACT

The invention relates to a hardtop vehicle roof with three roof pieces, which can be supported against the chassis, stacked together over the middle section, the front and rear roof pieces of which are jointed to the middle roof piece and can swing together in the same sense over the middle section to lie on the middle section, whereby a common drive is provided for the front and the rear roof piece, which is provided on the middle roof section.

20 Claims, 9 Drawing Sheets

Figure 1:
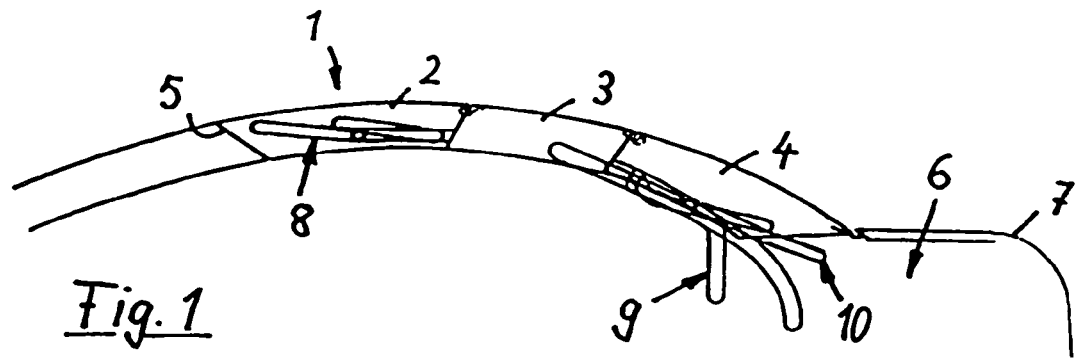

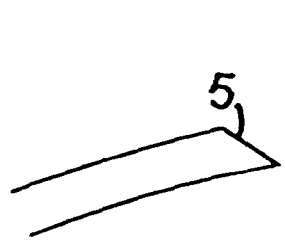
Fig. 4
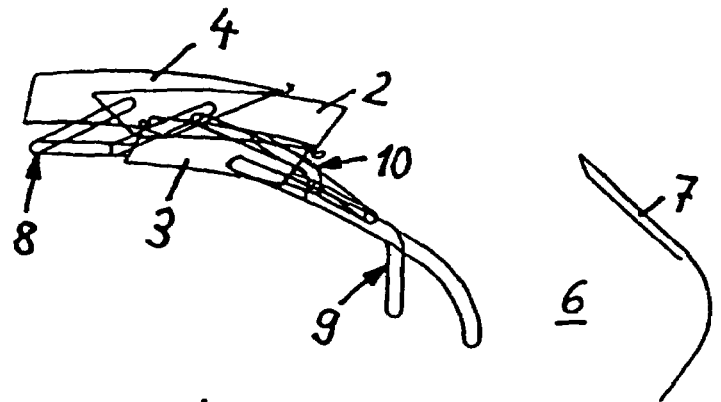
Fig. 5
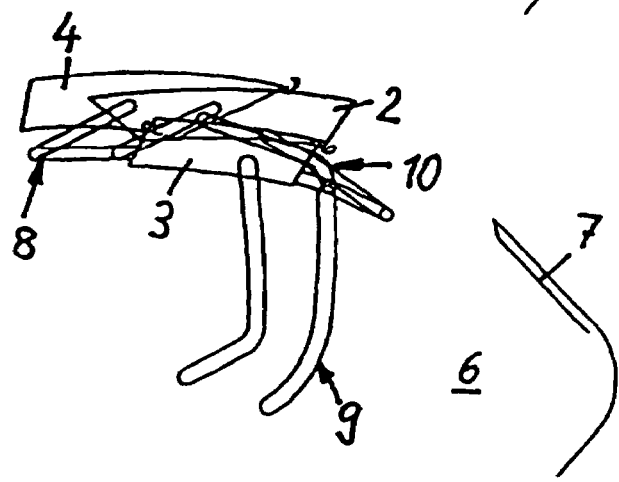
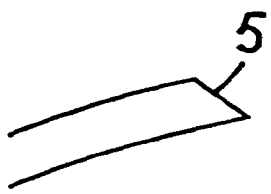
Fig. 6
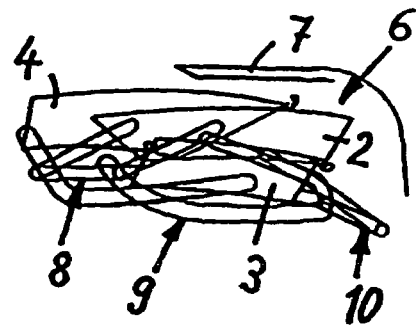

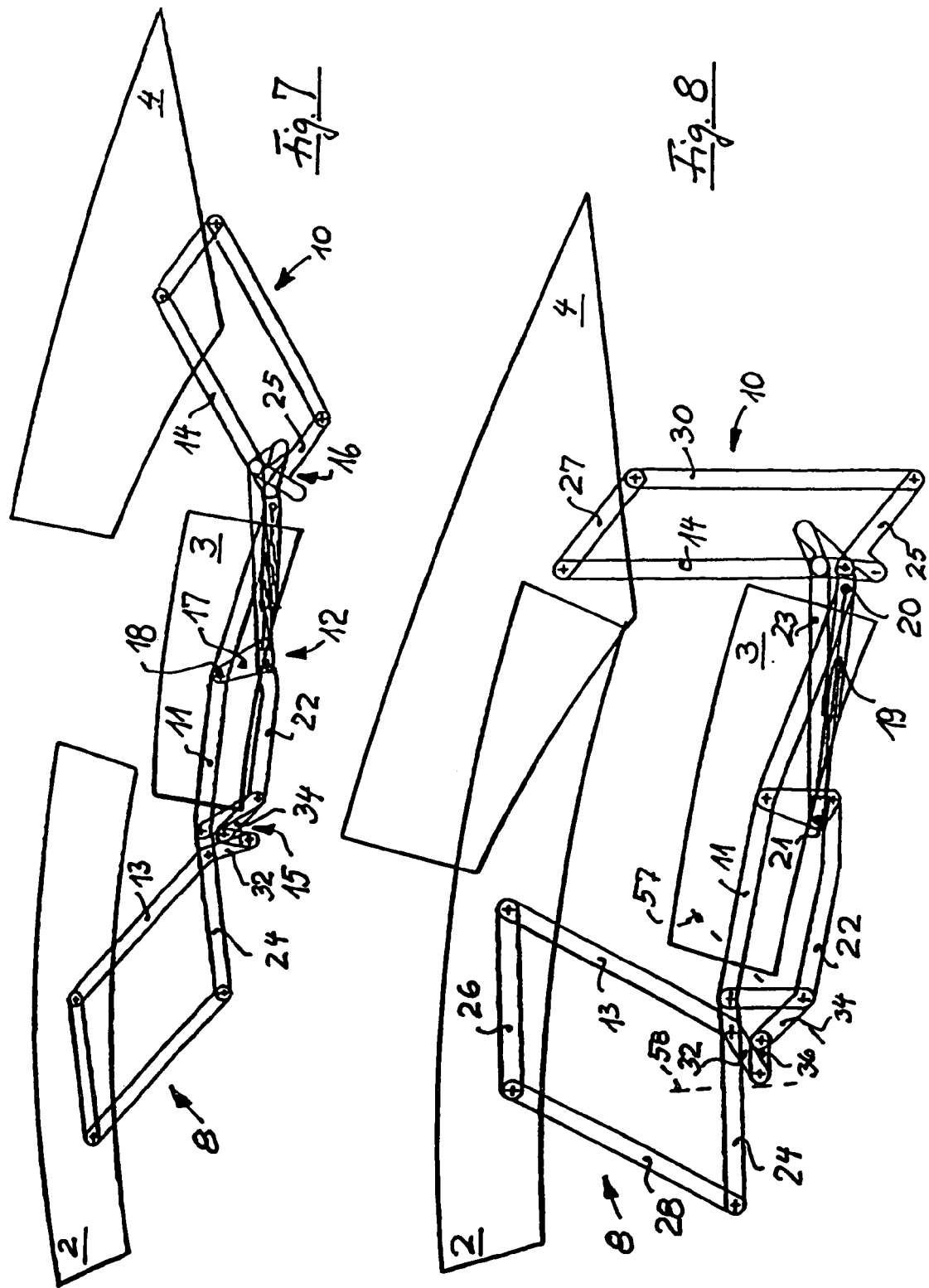

HARDTOP VEHICLE ROOF WITH THREE RIGID ROOF PIECES

This application claims priority to German application 102.15 663.8 filed Apr. 9, 2002, German application 102.43 070.5 filed Sep. 16, 2002, and German application 102.58 054.5 filed Dec. 11, 2002.

The invention relates to a hardtop vehicle roof having three rigid roof parts.

In the case of a vehicle roof of this type which is known from DE 196 42 152 A1, in the closed position of the roof the roof parts are situated directly one behind another and adjoining one another and, in the put-away position, are stacked to form a package of roof parts, in which the roof parts are situated one above another, the package being stored in a rear storage compartment. The rear roof part is connected pivotably to the body, and the front and the central roof part are coupled in each case to the roof part following next, via adjusting kinematics. In the package of roof parts, the central roof part is situated below the rear roof part and the front roof part is situated below the central roof part, with the result that the front roof part is situated lowermost, the central roof part is situated in the middle and the rear roof part is situated uppermost.

In order to transfer the vehicle roof into the put-away position, the vehicle roof is pivoted upwards in its entirety, with the roof parts maintaining a position with respect to one another that corresponds to the closed position of the roof, and only then is the package of roof parts built up by the front and central roof parts being pivoted in simultaneously in relation to each other and under the rear roof part, specifically with the orientation in the same direction being maintained. For the adjustment of the roof parts in relation to one another and the adjustment of the roof into its put-away position, a common drive is provided, in which the drive for the adjusting kinematics connecting the roof parts to one another is branched off from the adjusting kinematics for the rear roof part, via which kinematics the entire roof is supported. Despite a high outlay on kinematics and control technology, the possibilities for influencing the adjusting movements are limited as a result, with, in addition, exacting demands being placed on the stability of the adjusting kinematics and the drive, since the roof has to be opened with full extension before the formation of the package begins.

The invention is based on the object of designing a hardtop vehicle of the type mentioned at the beginning with the effect that extended adjustment possibilities arise with less stress on the overall kinematics and without impairing the size of the vehicle interior during the opening and closing of the vehicle roof.

According to the invention, this is achieved by the features of claim 1, with the subclaims showing expedient developments with respect thereto.

Owing to the fact that, in the case of the solution according to the invention, a layering of the package of roof parts is undertaken, with the front and rear roof parts being put away above the central roof part, the central roof part can maintain its position during the formation of the package of roof parts, and, as a result, impairments of the vehicle interior by the formation of the package are avoided. At the same time, the central region of the vehicle interior is opened up at a late point and covered at an early point, i.e. remains protected for longer. In addition, the package is adjusted as a whole, and there is no need, in the adjusting speed for the package of roof parts, to take into account the adjustment or the adjusting speed for the front and the rear roof parts which are coupled to the central roof part, which is connected directly to the body. The assignment of the drive for the front and the rear roof parts to the central roof part furthermore also advantageously gives rise to the possibility of pivoting these roof parts at the same time, and with their supporting moment being compensated for, in relation to the central roof part, with the result that, for the adjusting kinematics supporting the central roof part against the body and supporting the entire roof via the central roof part, favourable load ratios are provided, even in view of wind forces which act on the vehicle roof during its adjustment.

The assignment of the drive for the front and rear roof part to the central roof part makes it possible in a simple manner to work with a common drive and to design the latter in a simple and space-saving manner, with the use of driving countershaft assemblies in the connection between the central roof part and the front and rear roof parts supported by the latter providing additional possibilities of achieving the narrow package layering with little space being required and with extended possibilities of influencing the adjusting movement of the front and rear roof parts in relation to the central roof part.

It has proven particularly expedient in this case to work with different driving countershaft assemblies for the front and rear roof part, via which assemblies a balancing of the sequences of movement can be achieved in a favourable manner. According to the invention, it has proven expedient for this to work, on the one hand, with a four-bar kinematics and, on the other hand, with a five-bar mechanism as driving countershaft assemblies, in which case, with regard to the layering of the roof with the rear roof part being put away above the front roof part, designing the rear driving countershaft assembly as a four-bar kinematics and the front driving countershaft assembly as a five-bar kinematics has proven expedient.

Figure 9:
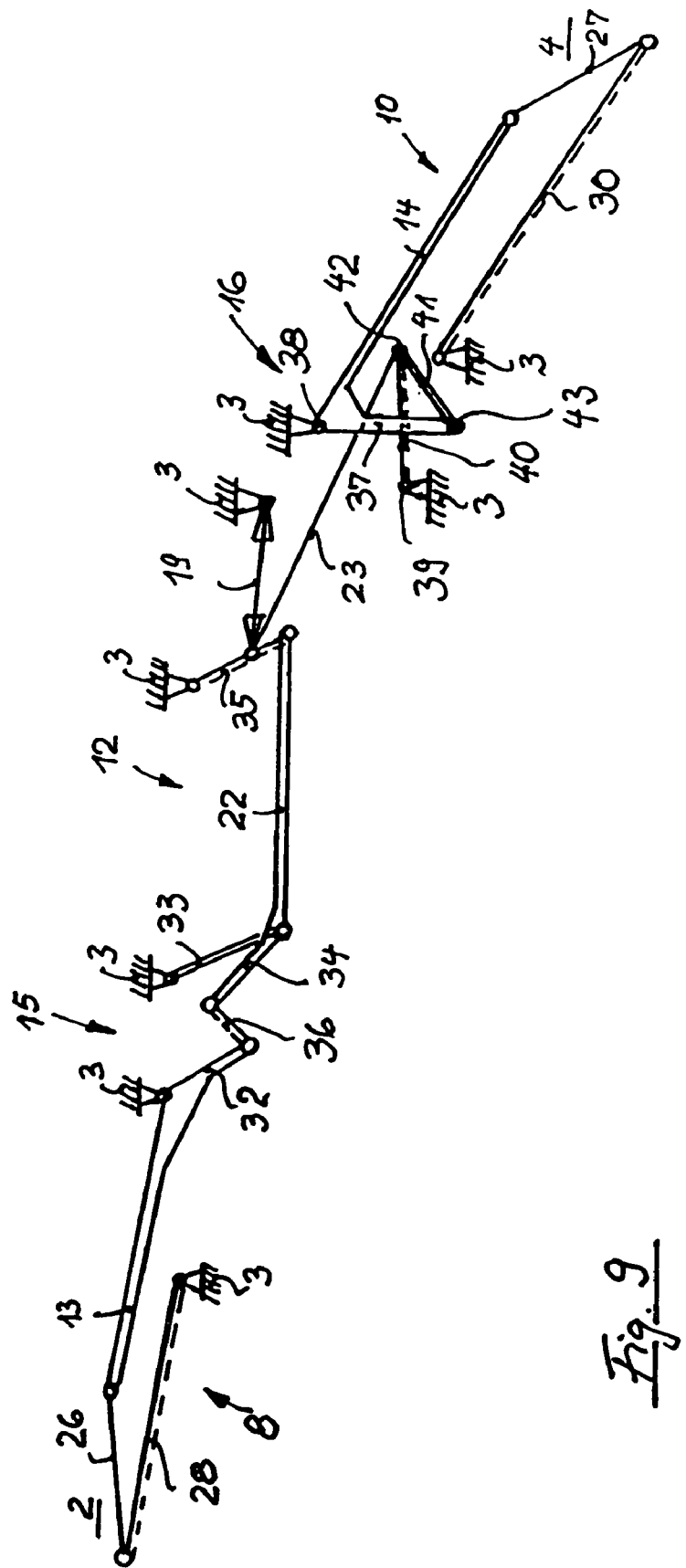
Figure 10:
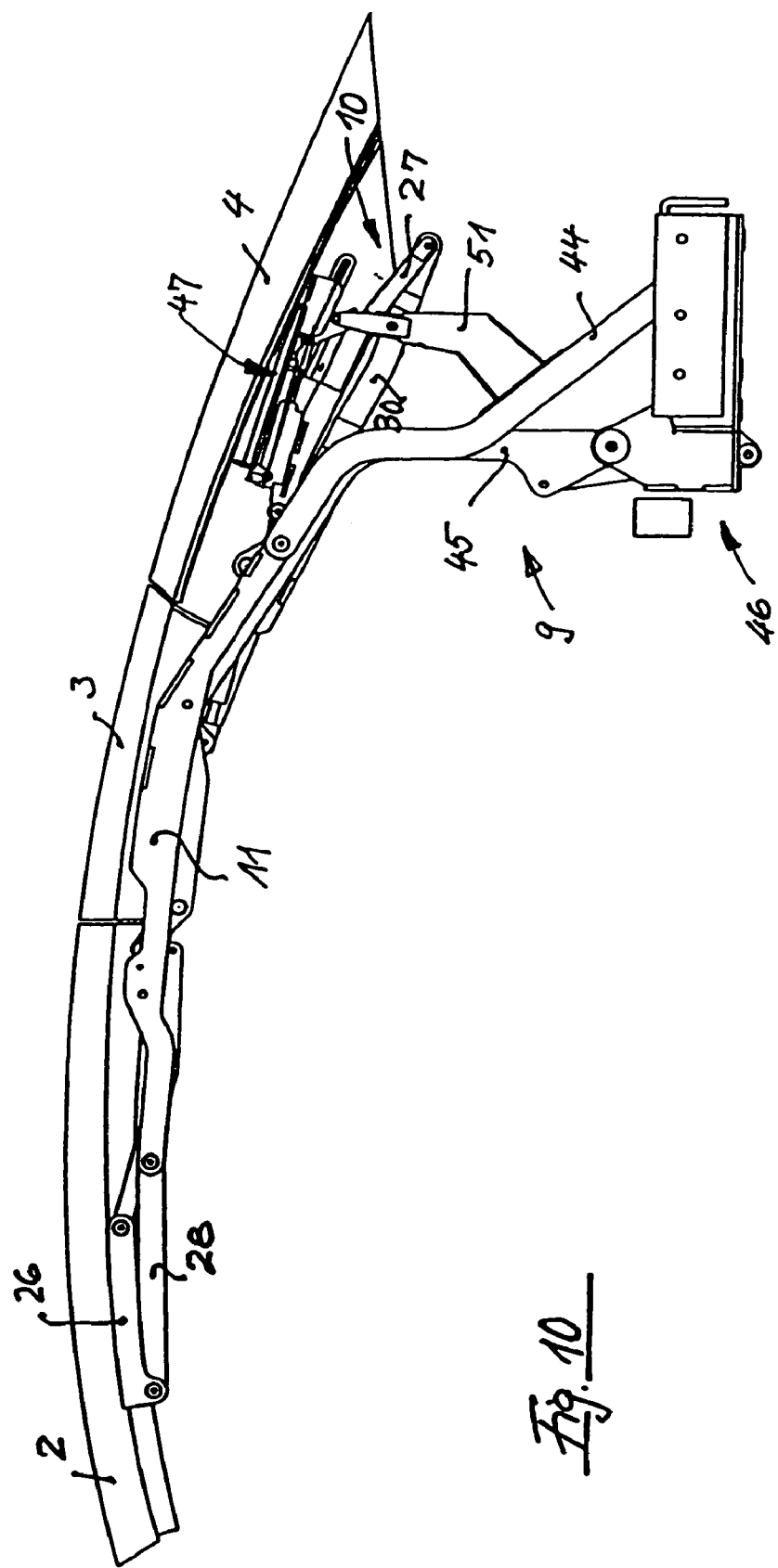
Figure 11:
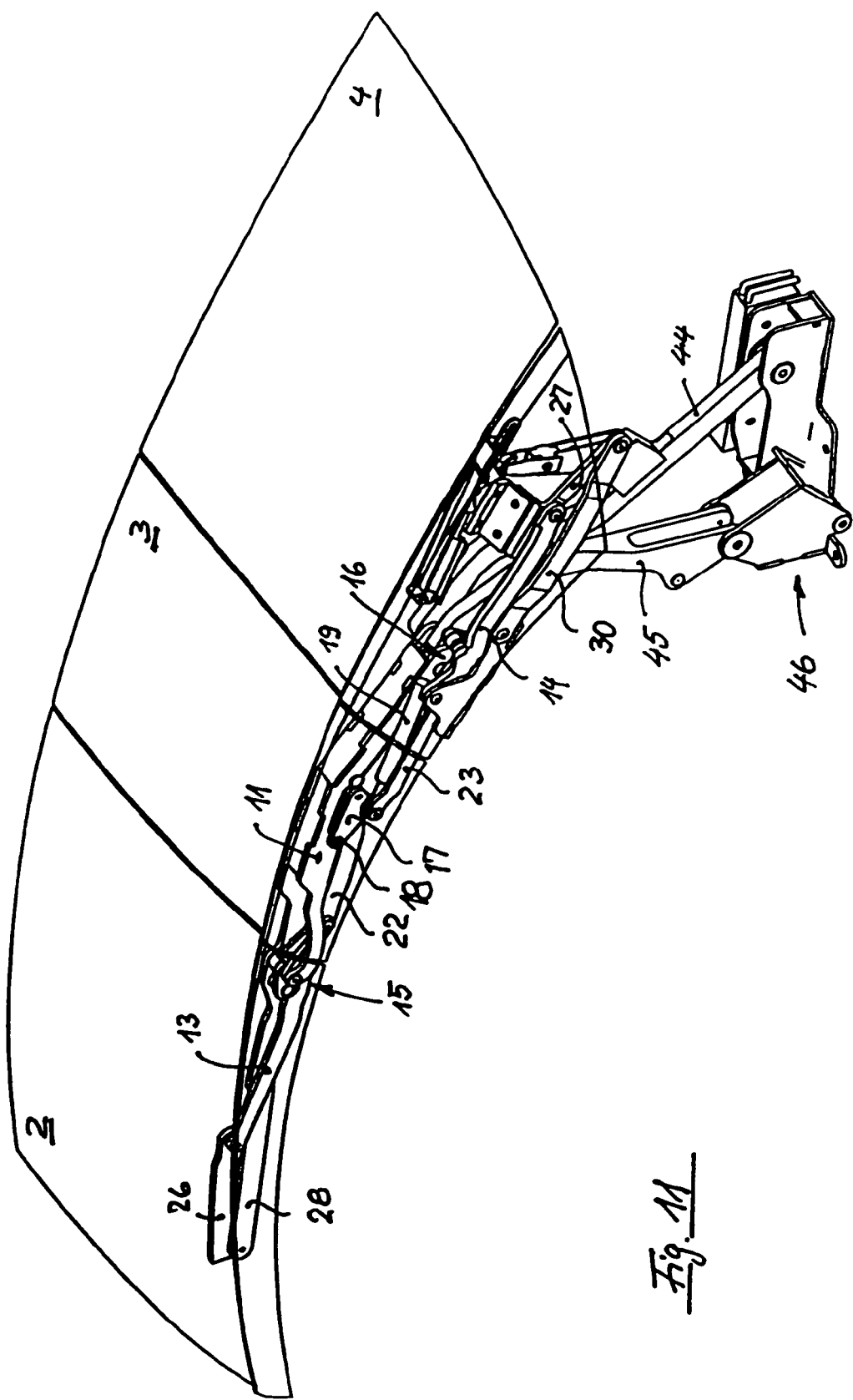
Figure 12:
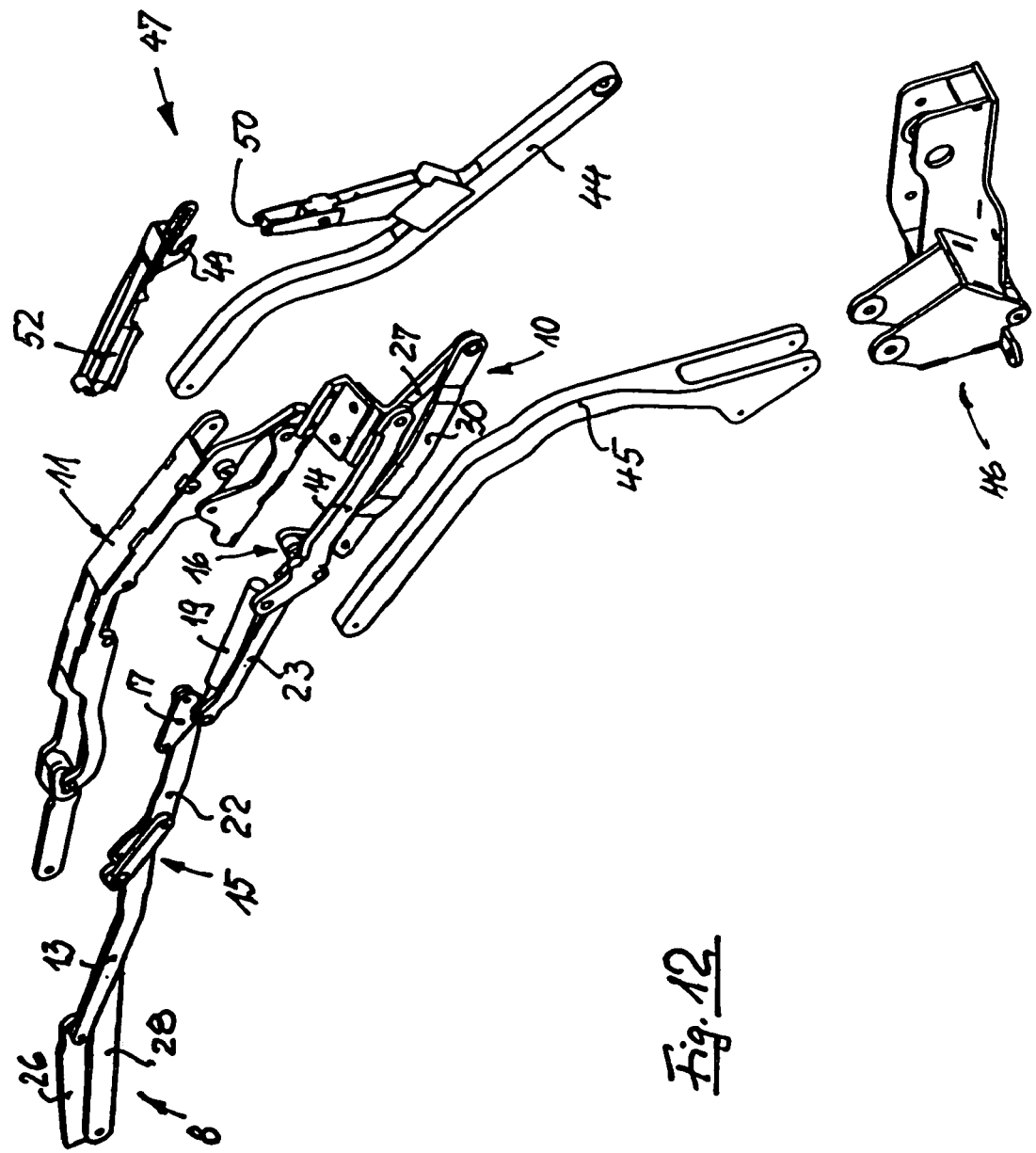
Figure 13:
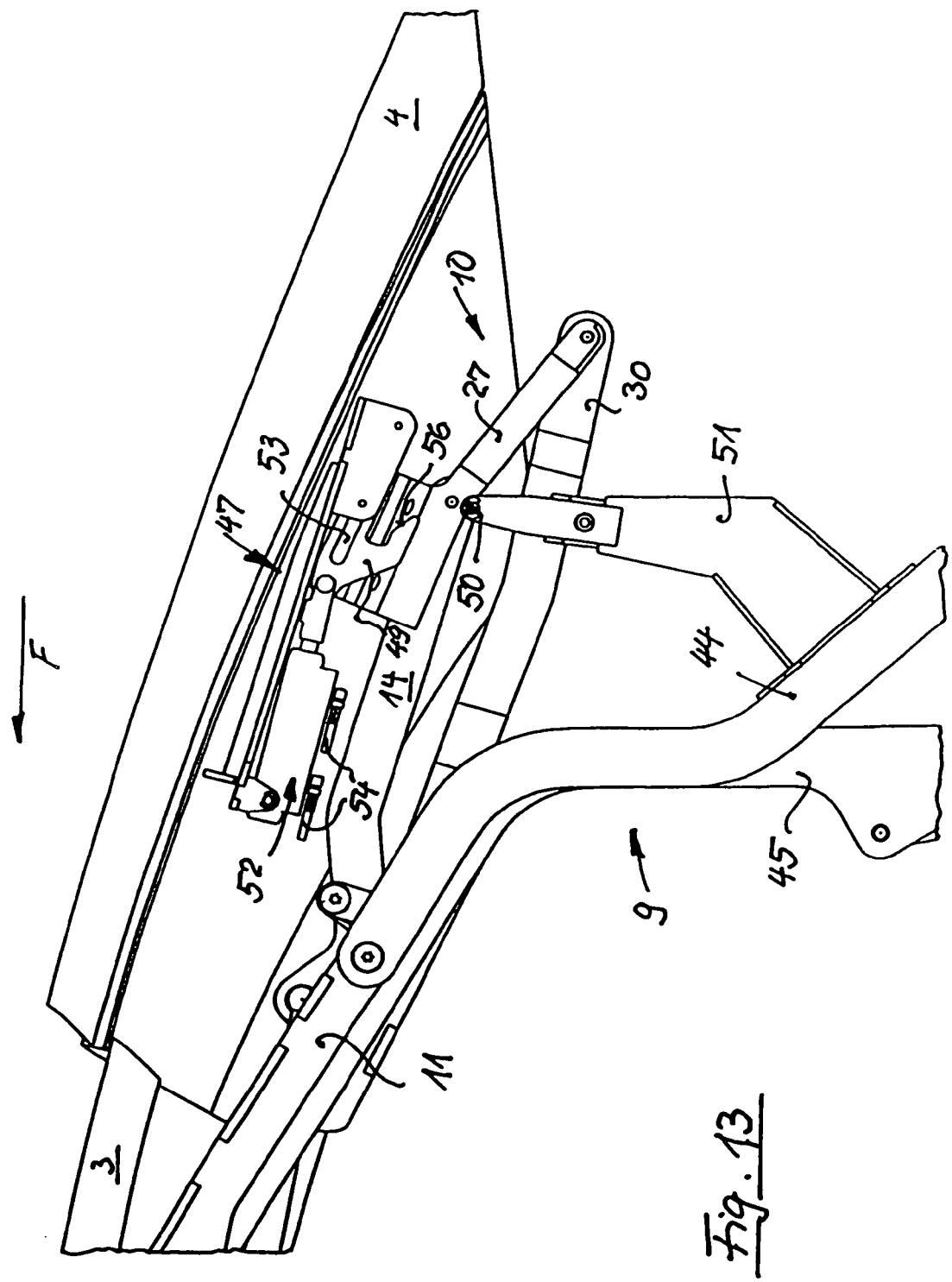
Figure 14:
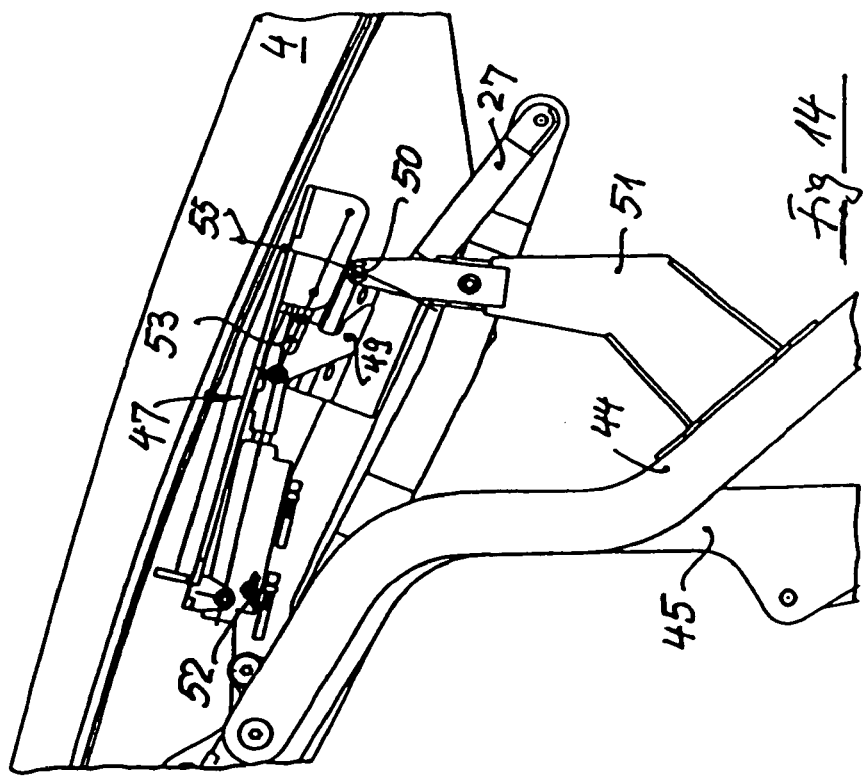
Figure 15:
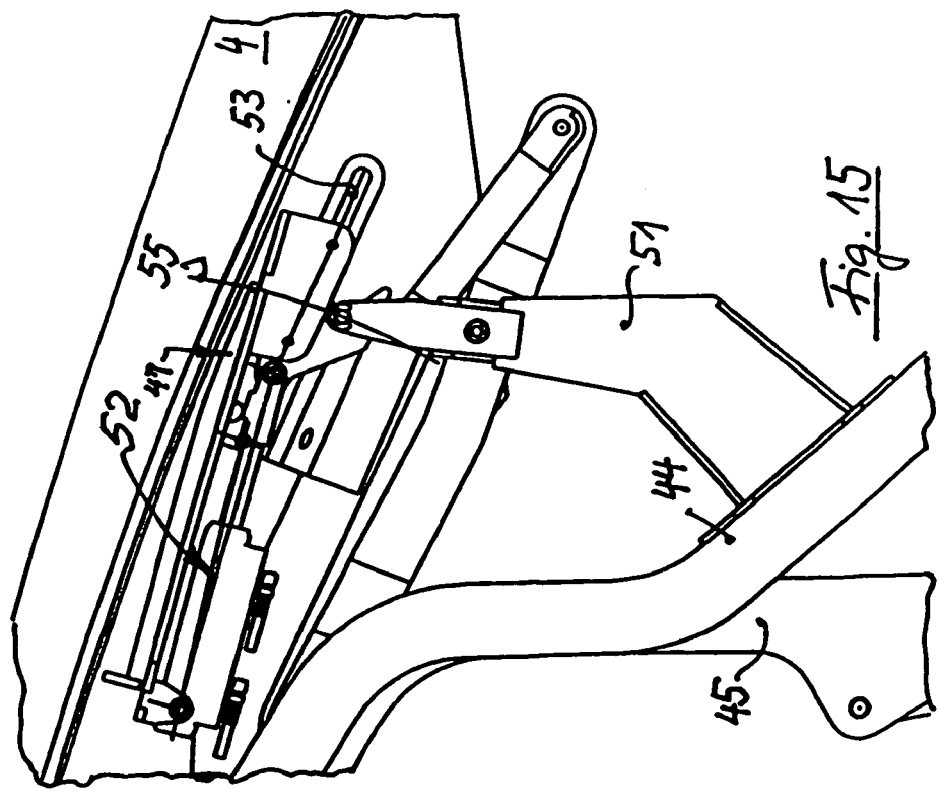

Further advantages and expedient variants can be gathered from the further claims, the description of the figures and the drawings, in which:

FIG. 1 shows, in a schematized illustration, a side view of a hardtop vehicle roof having three rigid roof parts, illustrated in the closed position, FIGS. 2 to 5 show the vehicle roof according to FIG. 1 in various intermediate positions during the transfer from the closed position into the put-away position, FIG. 6 shows the vehicle roof according to FIG. 1 in the put-away position, FIGS. 7 and 8 show a further, schematized illustration of intermediate positions of the vehicle roof, with the adjusting drive, which is assigned to the central roof part and is intended for the front and the rear roof part, being shown, but not the adjusting kinematics connecting the central roof part to the body, FIG. 9 shows, in a highly abstracted illustration, based on the closed position of the roof, the adjusting kinematics for the front and rear roof part and the adjusting drive for the front and rear roof part together with the associated driving-link connection, with the central roof part being indicated symbolically merely with regard to the coupling and supporting points assigned to it, FIGS. 10 to 12 show, in a side view in FIG. 10 and perspective view in FIG. 11, as seen from the inside (FIG. 10) and from the outside (FIG. 11), and partially cut away, one possible structural design of the hardtop vehicle roof according to the invention in the closed position, and, in FIG. 12, a simplified exploded illustration of the entire adjusting kinematics of the roof, based on one side of the roof, FIG. 13 shows, corresponding to FIG. 10, an enlarged illustration of the rear roof part in a cutout with the rear roof part still slightly deployed in relation to the central roof part, with, in this position which is situated in front of the closed position of the roof, a clamping connection, which is formed by interlocking elements, between the rear roof part and the four-bar kinematics attaching the central roof part to the body still being open, and FIGS. 14 and 15 show, based on the closed position of the roof and of the rear roof part, the clamping connection open and closed.

In the following figures, identical components are provided with identical reference numbers.

The vehicle roof 1 which is illustrated in FIG. 1 is a three-part hardtop having a front roof part 2, a central roof part 3 and a rear roof part 4, which parts are in each case of inherently rigid design and, in the closed position shown, are arranged situated directly one behind, another in a common roof plane. In the closed position, the front roof part 2 is adjacent to a front windscreen frame 5. The rear roof part 4 is adjacent to a rear lid 7 which covers over a storage space 6 for receiving the vehicle roof 1 in its put-away position, the storage space 6 either being identical to the trunk or forming part of the trunk.

Each of the roof parts is assigned an adjusting kinematics via which the relevant roof part can be adjusted relative to the vehicle body or relative to the adjacent roof part. The front roof part 2 is coupled adjustably via an adjusting kinematics 8 to the central roof part 3, which is attached movably to the vehicle body via a further adjusting kinematics 9. The rear roof part 4 is coupled analogously to the front roof part 2 via a dedicated adjusting kinematics 10 to the central roof part 3 and can be adjusted in relation thereto. In this illustration, the adjusting kinematics 8, 9 and 10 of the roof parts 2, 3, 4 are designed in each case as four-bar kinematics and can be actuated automatically via actuators.

Figure 2:
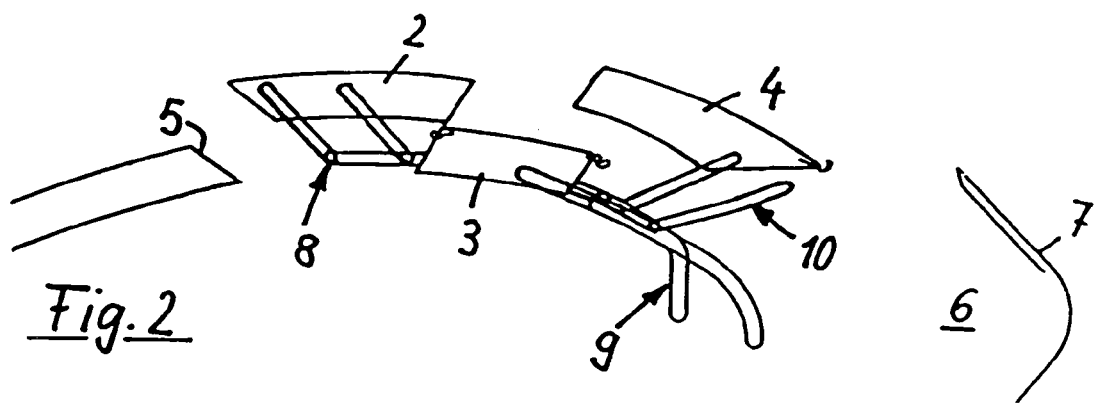

FIG. 2 illustrates the beginning of the opening or put-away movement of the vehicle roof during the transfer from the closed position into the put-away position. The rear lid 7 is pivoted up about a rear pivot axis, as a result of which a passage into the storage space 6 is opened to pass the vehicle roof through. At the beginning of the put-away movement, the central roof part 3, which is secured on the body, initially remains in its starting or closed position, and, in a synchronous movement, the front roof part 2 and the rear roof part 4, by their respectively assigned adjusting kinematics 8 and 10 being actuated, are raised relative to the central roof part 3 and set into a position above the central roof part 3. During the raising and pivoting movement of the two other roof parts, the central roof part 3 initially remains in its starting position. Owing to the front roof part 2 and rear roof part 4 being raised while the position of the central roof part 3 is unchanged, an impairment of the vehicle interior by adjusting kinematics or roof parts during the opening movement is avoided.

Figure 3:
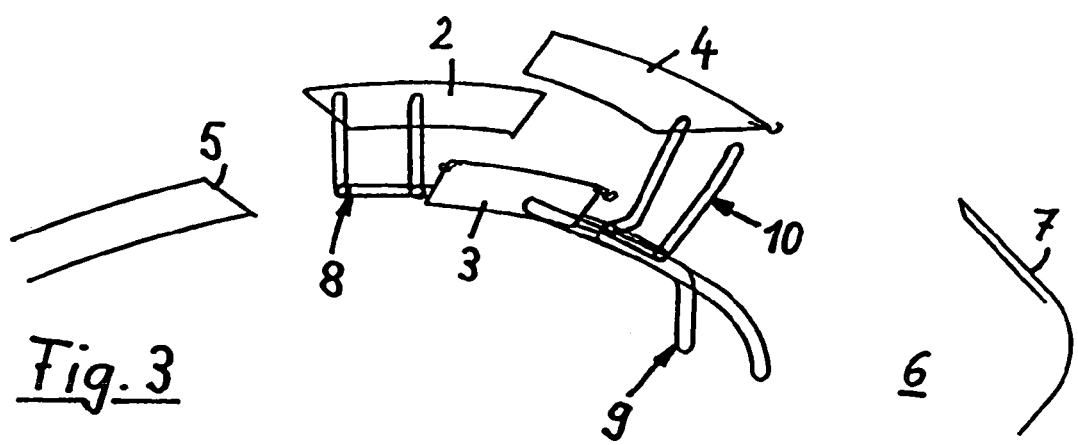

As can be gathered in particular from FIG. 3, in order to achieve a package of roof parts in which they are stacked one above another, the front roof part 2 is set into a position directly above the central roof part 3, and the rear roof part 4 is set into a position directly above the front roof part 2, as a result of which a stacked package of roof parts is produced, in which the central roof part 3 is put away lowermost, the front roof part 2 is put away situated in the middle, and the rear roof part 4 is put away uppermost.

Within the context of the invention, the package of roof parts may also be built up in a layered arrangement, in which the rear roof part is situated between the central roof part and the front roof part, it being possible for this to be achieved—this not being illustrated—by an adjusting kinematics which is appropriately adapted but has the same basic construction.

This package of parts is achieved in the intermediate position according to FIG. 4. Within the package of roof parts, all three roof parts 2, 3 and 4 are put away in the same direction with the outer side of the roof facing upwards. This orientation is also maintained in the put-away position of the vehicle roof in the storage space 6.

As can be gathered from FIG. 5, after the position of the package of roof parts is reached, the adjusting kinematics 9 of the central roof part 3 is actuated, and the entire package of roof parts is transferred relative to the vehicle body in a pivoting movement to the rear into the storage space 6. After the put-away position according to FIG. 6 is reached, the rear lid 7 can be closed again.

FIGS. 7 and 8 show, as an addition to FIGS. 1 to 6, the adjusting drive for the adjusting kinematics 8 and 10 of the front roof part 2 and rear roof part 4. The adjusting kinematics 9 for the central roof part 3 is not illustrated.

The central roof part 3 is supplemented in the drawing by a supporting bar 11 which bears the coupling points or joints of the adjusting kinematics 8 and 10, which points or joints are assigned to the central roof part 3, and the coupling points or joints of an adjusting drive 12 via which the front roof part 2 and rear roof part 4 are adjusted in relation to the central roof part 3.

The adjusting kinematics 8 and 10 are designed as four-bar kinematics or mechanisms, and, in the transition to the driving links 13 and 14 of the adjusting kinematics 8 and 10, respectively, the adjusting drive 12 has driving countershaft assemblies 15 and 16, respectively, as will be explained in greater detail below with reference to FIG. 9. With regard to the isochronously joint adjustment of the front roof part 2 and rear roof part 4 in relation to the central roof part 3, which adjustment is preferably provided within the context of the invention, the adjusting drive has an adjusting arm 17 which is designed as a pivoting arm, is mounted on the supporting bar 11 at 18 and is assigned, as a driving source for the adjusting drive 12, an adjusting cylinder 19 which extends between a support 20 on the supporting bar 11 and a support 21 against the adjusting arm 17 and therefore runs essentially in the longitudinal direction of the vehicle. As a driving-link connection to the adjusting kinematics 8 and 10 of the front roof part 2 and rear roof part 4, respectively, adjusting levers 22 and 23 which taper off onto the driving countershaft assemblies 15 and 16, respectively, are coupled to the adjusting arm 17.

FIGS. 7 and 8 illustrate that the adjusting kinematics 8 and 10 are designed as four-bar kinematics, the bases 24 and 25 of which are respectively formed by the central roof part 3 and supporting bar 11, the supporting bar 11 reaching beyond the central roof part 3 in the longitudinal direction of the vehicle in the coupling region of the adjusting kinematics 8 and 10. The connecting rods, assigned to the respective roof parts 2 and 4, of the respective adjusting kinematics 8 and 10, which are designed as four-bar kinematics, are respectively referred to by 26 and 27, and, of the links 28, 13 and 30, 14 of the adjusting kinematics 8 and 10, respectively, the links 13 and 14 which are adjacent to the central roof part 3 preferably form driving links.

FIG. 9 illustrates the fact that, of the driving countershaft assemblies 15 and 16, the driving countershaft assembly 15, which is provided in the transition to the front roof part 2, is designed as a five-bar mechanism while the driving countershaft assembly 16, which is situated in the transition to the rear roof part 4, is designed as a crossed-over four-bar mechanism. The joining of the individual fulcrum points to the central roof parts 3 is illustrated symbolically in each case, for the adjusting kinematics 8 and 10 and for the adjusting drive 12, as a securing point to the roof 3, the comparison with FIGS. 7 and 8, in particular, making it possible to see the position of the individual fulcrum points, in particular also through the use of the same reference numbers as in FIGS. 7 and 8. In order to facilitate the overview, illustrations which are partially different (double line in solid lines, double line with dashed line, etc.) have also been selected for the various links in FIG. 9.

The driving countershaft assembly 15 in the transition between the roof part 3 and roof part 2, which is designed as a five-bar kinematics, comprises links 32 and 33 which emerge from the attachment to the roof part 3 as a base and of which the link 32 is formed by an arm of the driving link 13 of the adjusting kinematics 8, with the result that the driving link 13 is represented overall as an angle lever. The adjusting lever 22 is similarly represented as an angle lever, the angled region forming a link 34 and the adjusting lever 22 being coupled to the central roof part 3 in the manner of a parallelogram via the link 33 and a link 35 and being guided by pivoting in a manner such that it can be displaced in the longitudinal direction of the vehicle approximately parallel to the roof part 3. The link 33 forms a guide link of the five-bar kinematics provided as the driving countershaft assembly 15.

The links 32 and 34, which are respectively assigned in a fixed position to the driving link 13 and to the adjusting lever 22, which extends in the longitudinal direction of the vehicle, runs along the roof part 3 and can be displaced, are connected via an intermediate link 36. During the adjustment of the roof part 2, this intermediate link 36 pivots in relation to the link 32 and, in the end positions of the roof 2, takes up, in rough approximation, positions 57 or 58—symbolized in each case by a dashed line in FIG. 8—in the position 57 of which, which corresponds to the closed position of the roof, the intermediate link 36 protrudes downwards from the link 34 (FIGS. 7 and 9) and in the position 58 of which, which corresponds to the package position of the roof 2, the intermediate link 36 extends upwards from the link 34, the intermediate link 36, based on its direction of extent, in the exemplary embodiment passing through a pivoting region about its coupling to the link 32, which region opens towards the side facing away from the roof part 3 and is significantly more than 180°. In the exemplary embodiment, this pivoting region is of the order of magnitude of 270°, with the size of the angle enclosed by the intermediate link 36 in the end positions in relation to the link 32 being approximately the same size in the two end positions and being in the region of 90°, given a pivoting distance of the link 32 about its coupling point on the roof of approximately 180°.

On the opposite side, the driving connection to the adjusting kinematics 10 of the rear roof part 4 takes place via the driving countershaft assembly 16, which is designed as a four-bar mechanism, one link 37 of which is formed by an arm the driving link 14 of the adjusting kinematics 10, which arm is angled approximately through 45° in the exemplary embodiment with the result that, also with regard to the adjusting kinematics 10, the driving link 14 is an angle lever. The base of the driving countershaft assembly 16 designed as a four-bar mechanism is determined by the coupling point 38 of the driving link 14 to the roof part 3 and a coupling point 39 for a link 40 to the roof part 3, which link, in the illustrated closed position of the roof, extends essentially perpendicular with respect to the link 37 and crosses over the latter, that end of the link 40 which lies opposite the coupling point 39 being connected to the free end of the link 37 via a link 41 as connecting rod. The corresponding coupling points are referred to by 42 and 43, and the adjusting lever 23 engages in the coupling point 42 between the link 41, which forms the connecting rod, to the link 40, said adjusting lever, like the adjusting lever 22, being connected to the link 35 which is acted upon by the adjusting cylinder 19 (illustrated symbolically).

The outlined designed of the driving countershaft assemblies 15, 16 results in an essentially synchronous adjusting movement of the roof parts 2 and 4 in relation to the roof part 3, the adjusting speed in the end phases of the adjustment being significantly reduced in comparison to the adjusting speed in the central adjusting region because of the kinematic configuration.

FIGS. 10 to 12 show a structural embodiment of the above-described adjusting and driving kinematics, with, as an addition to the adjusting kinematics 9 for the central roof part 3, the C-pillar link 44 and the main link 45 of said kinematics being shown in the attachment to a bracket 46 on the body. The bracket 46, this not being shown specifically, being assigned the drive for the adjusting kinematics 9. This overall arrangement furthermore illustrates a clamping connection 47 between the rear roof part 4 and the C-pillar link 44, said clamping connection, as is shown in greater detail below with reference to FIGS. 13 to 15, comprising an adjustable interlocking element 49, which is assigned to the rear roof part 4, and a further interlocking element 50, which is arranged on the C-pillar link 44 via a support 51, the two interlocking elements 49 and 50, with the rear roof part 4 closed, being in an engaged position with respect to each other and being lockable to each other via an actuator 52, which is assigned to the interlocking element 49 on the roof, with the result that despite the vehicle roof 1 being connected as a whole via the central roof part 3 to the body of the vehicle, the rear roof part 4 can additionally be braced against the body, in which case the adjusting kinematics 10, via which the rear roof part 4 is connected to the central roof part 3, can be relieved from load and the roof 1 can be braced as a whole.

In FIG. 13, with the roof part 4 slightly raised in relation to the central roof part 3—the roof part 3 is in its position corresponding to the closed position of the roof 1—the adjusting kinematics 9 supporting the central roof part 3 are partially illustrated, together with the C-pillar link 44 and the main link 45, and also the adjusting kinematics 10, via which the rear roof part 4 is coupled to the central roof part 3, together with the connecting rod 27 and the link 30 and also the driving link 14 can be seen. The link 30 is coupled, it not being possible to see this in the cutout, to the supporting bar 11 at its end which is in front with respect to the direction of travel F and which faces the central roof, part, and is therefore fixed in position with regard to its coupling point to the central roof part 3. The roof-side interlocking element 49 of the clamping connection 47 is fastened to the coupling-rod link 27 in a manner such that it can be displaced in the longitudinal direction of the vehicle via the adjusting drive 52, a slotted-guide mechanism 53 being provided as the sliding guide, and it being possible for that part of the clamping connection 47 which is assigned to the rear roof part 4, together with the actuator 52 and the interlocking element 48 and the associated slotted-guide mechanism 53 to be coupled as a whole to the roof part 4 in a manner such that they can pivot about an axis running in the direction of displacement, this not being shown here. The actuator 52 is indicated as a linear drive having supply connections 54 for an adjusting cylinder.

The counterpart to the interlocking element 49 on the roof part is formed by the interlocking element 50 in the form of a bolt which is fixed in position with respect to the support 51 and which is situated adjacent to the run-in track 55 (see FIGS. 14 and 15) of the interlocking element 49 on the roof part when the rear roof part 4 runs into its closed position, in which it is situated flush with the central roof part 3, with the result that via the actuator 52, in particular in conjunction with a run-in slope 56 on the interlocking element 49, longitudinal displacement of the interlocking element 49 enables a latching to be achieved which also contributes to the bracing of the entire roof and its support in a fixed position in relation to the body, and therefore to an overall stiffer assembly, a very stiff assembly also being achieved at low loads by the connection of the clamping connection 47 to the C-pillar link 44 in the region of the bracket 46.

FIGS. 14 and 15 refer to the flush closed position of the rear roof part 4 to the central roof part 3, and FIG. 14 shows the starting position of the clamping connection 47 for producing the latching via the interlocking elements 49 and 50, while FIG. 15 shows the clamping connection 47 in the interlocked state.

The invention claimed is:

1. Hardtop vehicle roof having three rigid roof parts which can be adjusted between a closed position covering the vehicle interior and a put-away position opening up the vehicle interior, in the closed position the roof parts are arranged one behind another in the longitudinal direction of a vehicle body, the roof parts are in each case provided with an adjusting kinematics for adjusting the roof position and are connected to one another, the roof parts also are jointly supported against the vehicle body via the adjusting kinematics of a roof part, the roof parts, in the put-away position, being situated one above another and forming a package of roof parts, wherein the package of roof parts comprises a central roof part that is put away lowermost and a front roof part and a rear roof part are situated above the central roof part, in that the central roof part is provided as the roof part which jointly supports the front and rear roof parts against the vehicle body, an adjusting drive for adjusting the front roof part and the rear roof part in relation to the central roof part is provided on the central roof part.

2. Hardtop vehicle roof according to claim 1, wherein the adjusting drive for the front roof part and the rear roof part has a common driving source.

3. Hardtop vehicle roof according to claim 2, wherein the driving source is an adjusting cylinder.

4. Hardtop vehicle roof according to claim 2, wherein the adjusting drive has an adjusting arm which is coupled to the central roof part and from which adjusting-lever connections to the adjusting kinematics supporting the front roof part and the rear roof part are provided.

5. Hardtop vehicle roof according to claim 1, wherein the adjusting kinematics of the front, central, and rear roof parts are designed as four-bar kinematics.

6. Hardtop vehicle roof according to claim 1, wherein following the adjusting kinematics of the front roof part and rear roof part, the adjusting drive comprises driving countershaft assemblies.

7. Hardtop vehicle roof according to claim 6, wherein one driving countershaft assembly is designed as a four-bar kinematics.

8. Hardtop vehicle roof according to claim 7, wherein the four-bar kinematics provided as the driving countershaft assembly is formed by a four-bar mechanism, the base of which is fixed in position with respect to the central roof part.

9. Hardtop vehicle roof according to claim 8, wherein a pair of links which connect the base and a connecting rod of the four-bar mechanism forming a driving countershaft assembly that cross over each other.

10. Hardtop vehicle roof according to claim 9, wherein one link of the four-bar mechanism forming a driving countershaft assembly is fixed in position with respect to the driving link of the four-bar kinematics supporting a roof part.

11. Hardtop vehicle roof according to claim 6, wherein one driving countershaft assembly is designed as a five-bar kinematics.

12. Hardtop vehicle roof according to claim 11, wherein the five-bar kinematics is formed by a five-bar mechanism, the base of which is fixed in position with respect to the central roof part.

13. Hardtop vehicle roof according to claim 12, wherein one link of the five-bar mechanism is fixed in position with respect to the driving link of the four-bar kinematics supporting the first roof part.

14. Hardtop vehicle roof according to claim 12, wherein one link of the five-bar mechanism is fixed in position with respect to an adjusting lever of the adjusting drive connecting the front roof part and the rear roof part.

15. Hardtop vehicle roof according to claim 12, wherein one link of the five-bar mechanism is fixed in position with respect to the one adjusting lever of the adjusting drive is guided via a link which is coupled to the base of the said mechanism.

16. Hardtop vehicle roof according to claim 12, wherein the driving countershaft assembly situated in the transition to the front roof part is the five-bar mechanism.

17. Hardtop vehicle roof according to claim 7, wherein the driving countershaft assembly situated in the transition to the rear roof part is a four-bar mechanism.

18. Hardtop vehicle roof according to claim 1, wherein in the put-away position, in the package of roof parts the central roof part is put away lowermost, the front roof part is put away in the middle and the rear roof part is put away uppermost.

19. Hardtop vehicle roof according to claim 1, wherein an outer side of each of the front, central, and rear roof parts face upwards in the put-away position.

20. Hardtop vehicle roof according to claim 1, wherein during the transfer of the roof parts between their closed position and put-away position, the front roof part and the rear roof part can be adjusted simultaneously, in particular in a synchronous movement.

* * * * *